Feb. 6, 1934.   O. T. McILVAINE   1,946,354
RECTIFIER TUBE
Filed Dec. 28, 1928

Inventor
Owen T. McIlvaine
BY
                                    ATTORNEY

Patented Feb. 6, 1934

1,946,354

UNITED STATES PATENT OFFICE 1,946,354

RECTIFIER TUBE

Oran T. McIlvaine, Cleveland, Ohio, assignor to McIlvaine Patent Corporation, St. Charles, Ill., a corporation of Delaware Application December 28, 1928
Serial No. 329,048

6 Claims. (Cl. 250—27.5)

This invention relates to an improvement in rectifier tubes.

The object of the invention is to rectify the voltage for radio tubes or other uses and to step it up to twice its original value wihout the use of a transformer of any kind.

The present invention has many advantages over any of the rectifying tubes which have heretofore been used, among which may be mentioned that it rectifies the AC voltage and also doubles the voltage put into it without the use of a transformer. Condensers used with this rectifier for filtering are operated at half the voltage delivered, and therefore the condensers can be cheaper made and yet will have twice the life. A power supply using this rectifier may be made much more compact than usually.

Figure 1:
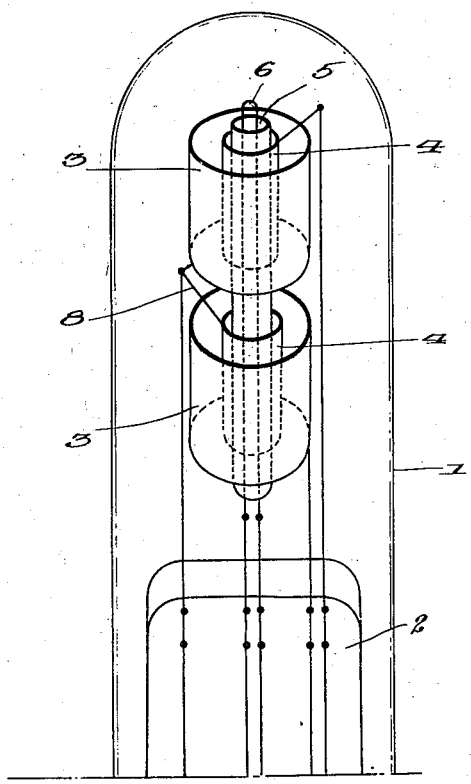
Fig. 1 is a perspective view of the rectifier tube.

The numeral 1 designates the rectifier tube generally having an insulating press or closure 2, serving to close the lower end of the tube and also to act as a support for the operating elements in the tube.

Mounted within the tube 1 are cylindrical anodes 3, arranged one above the other, and approximately in alignment with each other. Cathodes 4 also cylindrical in form are arranged within the respective anodes 3 and have common axes therewith.

A cylindrical insulator 5 extends longitudinally through both of the cathodes 4 and within which insulator 5 a filament 6 extends. One of the anodes 3 is connected with the other cathode 4 by means of a wire 8, as shown in both figures of the drawing.

Figure 2:
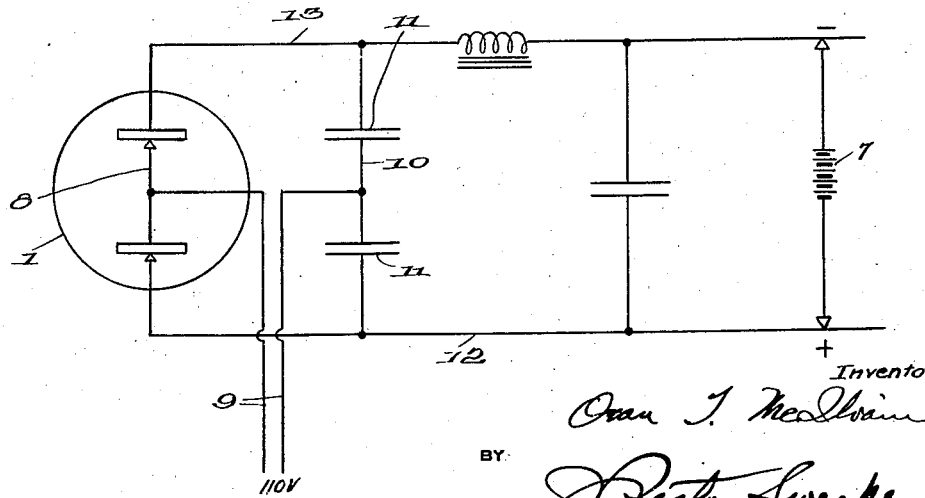
Fig. 2 is a diagrammatic view showing it as used in a circuit.

As shown in Fig. 2, AC current is supplied to the circuit at 110 volts, preferably, by the wires 9, one of which is connected to the wire 8 and the other to a wire 10 extending between the condensers 11, through which it is connected to the circuit wires 12 and 13, one of which extends from one of the cathodes and the other from the other anode, and at the opposite ends these wires deliver DC current at 220 volts.

This rectifier tube therefore doubles the voltage without the necessity of a transformer and permits of using cheaper condensers with longer life than heretofore, and it also renders the power unit more compact.

I claim:

1. A voltage multiplying rectifier tube comprising rectifier anodes and rectifier cathodes, one of said anodes being electrically connected to the other cathode.

2. A voltage multiplying rectifier tube having oppositely disposed anodes and separate cathodes for said anodes, one of said anodes being electrically connected within the tube to the other cathode.

3. A voltage multiplying rectifier tube having aligned and separated anodes, cathodes located in operative relation with the respective anodes, and heating means for said cathodes, one of said anodes being electrically connected within the tube to the other cathode.

4. A voltage multiplying rectifier tube including aligned, cylindrical anodes, and cylindrical cathodes positioned concentrically in respective anodes, one of said anodes being electrically connected to the other cathode, a cylindrical insulator extending through both of the cathodes, and a filament extending through the insulator.

5. A voltage multiplying rectifier tube comprising an evacuated vessel, two cylindrical rectifier anodes mounted therein coaxially in longitudinal alignment, cylindrical rectifier cathodes disposed within and cooperating with the anodes, and a filament disposed within the vessel and extending longitudinally through the cathodes, and an insulator surrounding the filament.

6. A voltage multiplying rectifier tube comprising an evacuated vessel, and two pairs of cooperating rectifier anodes and cathodes arranged in the chamber of said vessel, one of the cathodes being connected with the anode of the other pair, to substantially increase the electric current supplied to said rectifier tube without the use of a transformer.

ORAN T. McILVAINE.

CERTIFICATE OF CORRECTION.

Patent No. 1,946,354          February 6, 1934

Oran T. McIlvaine

It is hereby certified that error appears in the above numbered patent requiring correction as follows:

In the drawing Figure 2 should appear as shown below instead of as shown in the present drawing of the patent;

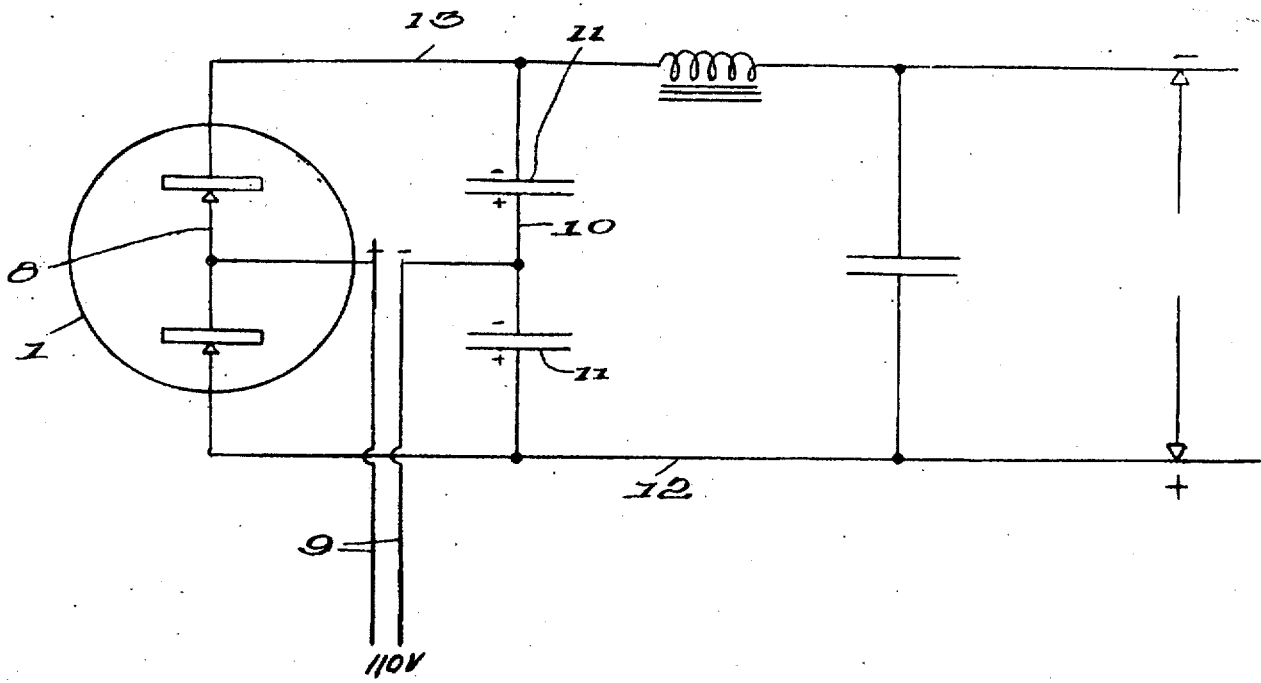

and that the said Letters Patent should be read with this correction therein that the same may conform to the record of the case in the Patent Office.

Signed and sealed this 27th day of March, A. D. 1934.

(Seal)                        F. M. Hopkins
                              Acting Commissioner of Patents.